United States Patent [19]
Cooper

[11] Patent Number: 5,687,300
[45] Date of Patent: Nov. 11, 1997

[54] PROCESS FOR CREATING FIVE TO SEVEN COLOR SEPARATIONS USED ON A MULTICOLOR PRESS

[75] Inventor: Ted Cooper, Sunnyvale, Calif.

[73] Assignee: Linotype-Hell AG, Kiel, Germany

[21] Appl. No.: 409,850

[22] Filed: Mar. 27, 1995

[51] Int. Cl.⁶ ............ G06F 15/00; H04N 1/52; G03F 3/08
[52] U.S. Cl. ............ 395/109; 358/523; 358/534; 358/535; 358/536
[58] Field of Search .................. 358/515, 518, 358/500, 501, 523, 536, 535, 534; 382/162, 167; 395/109

[56] References Cited

U.S. PATENT DOCUMENTS

| | | | |
|---|---|---|---|
| 3,555,262 | 1/1971 | Shimada | 235/193 |
| 4,683,492 | 7/1987 | Sugiura et al. | 358/518 |
| 4,812,899 | 3/1989 | Kueppers | 358/500 |
| 4,878,977 | 11/1989 | Kueppers | 156/264 |
| 4,924,301 | 5/1990 | Surbrook | 358/456 |
| 5,010,814 | 4/1991 | Shishikura | 101/211 |
| 5,166,809 | 11/1992 | Surbrook | 358/456 |
| 5,253,082 | 10/1993 | Hayashi et al. | 358/456 |
| 5,327,257 | 7/1994 | Hrytzak et al. | 358/447 |
| 5,339,176 | 8/1994 | Smilansky et al. | 358/518 |

FOREIGN PATENT DOCUMENTS 17 71 422  2/1981  Germany.

*Primary Examiner*—Kim Vu
*Assistant Examiner*—Fia H. Harris
*Attorney, Agent, or Firm*—Hill, Steadman & Simpson

[57] ABSTRACT

In a method for creating at least five to seven color separations for input into a raster image processor for creation of at least five screen separations for use with at least a five color press to create at least a five color printed page, a scanned digitized image is created represented by at least three digitized color image signals. These at least three digitized color image signals are input into a digital color separation computer. The digital color separation computer is used to create at least five single color unscreened image separations in the form of computer files. The computer files are input into a raster image processor to create at least five single color screen separations in the form of electronic signals. The electronic signals are then fed to a film recorder to create at least five single color screen separation films used in conjunction with a five color press to create the at least five color printed page. The digital color separation computer computes four color signals from the three digitized color image signals of the digitized image and then creates a fifth color signal by searching for a maximum saturated color from among three colors derived from the at least three digitized color image signals. Correction factors in the form of tables are created representing various printing environment parameters. These correction factors are applied to the at least five color signals to obtain the at least 5-color separations.

11 Claims, 4 Drawing Sheets

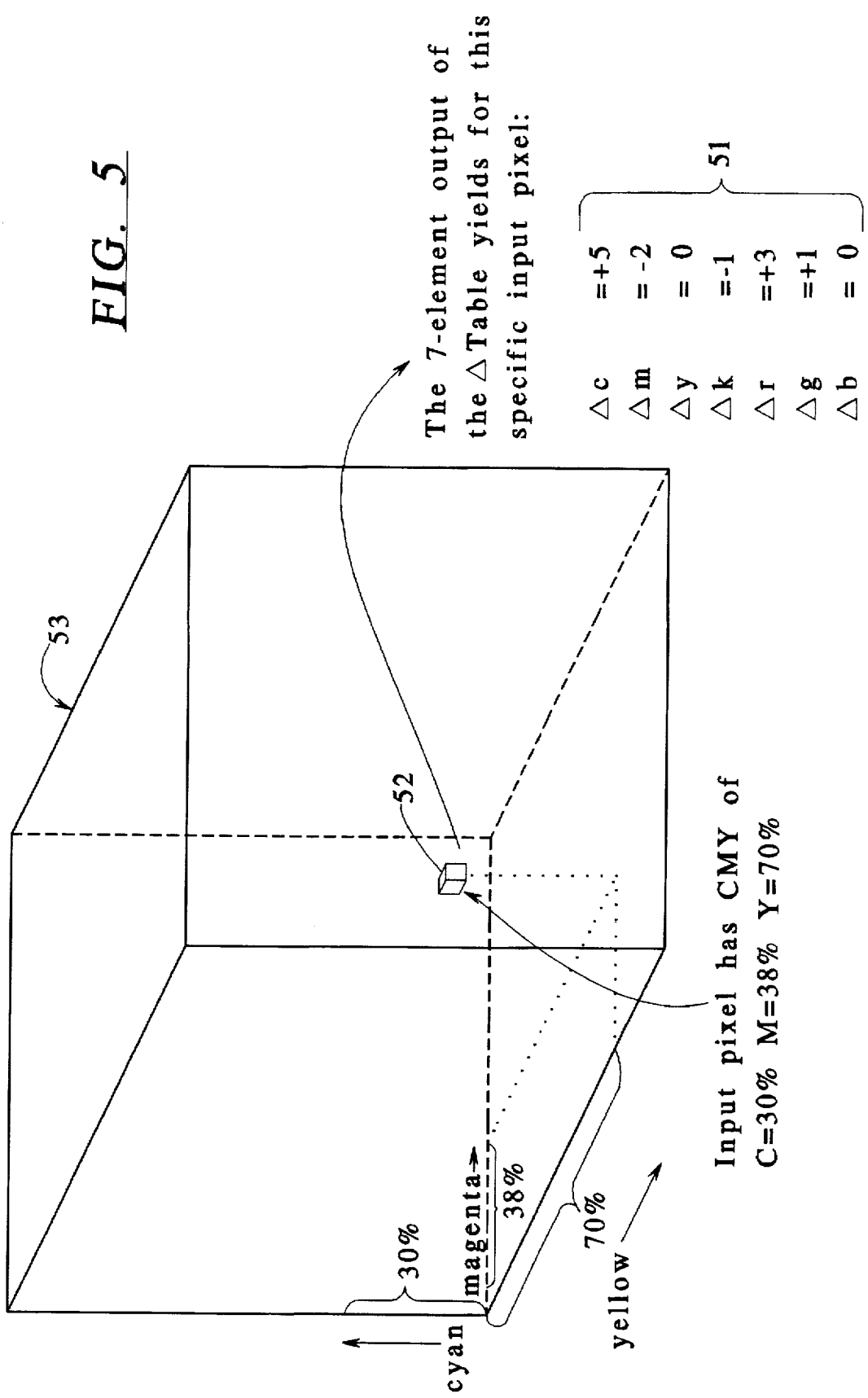

PROCESS FOR CREATING FIVE TO SEVEN COLOR SEPARATIONS USED ON A MULTICOLOR PRESS

BACKGROUND OF THE INVENTION

Field of The Invention

Printing With 4 Colors

The printing industry depends upon the metameric properties of the human eye to fool the perceiver into believing that a range of a hundred thousand colors are present, when in reality there are only three or four colors on the page. Theoretically, only three colors are necessary to stimulate the eye and create the appearance of a vast range of colors. In reality, four colors are needed because the standard three printing colors (cyan, magenta, and yellow) have pronounced limitations. These limitations stem from significant impurities in the magenta and cyan regions. The presence of equal amounts of cyan, magenta, and yellow should produce a saturated black when applied to white paper under suitable viewing conditions. In actual observation, equal amounts of the three standard inks produce a brownish-green colored black. Since the majority of all printed pages are dominated by black ink—because most pages are textual in nature—the printing industry has added a natural black to the three colored inks to produce 4-color printing.

Desktop Publishing (DTP) has become so dominant today that the majority of new color pages are produced from personal computer files. This means that typical printed pages are created in some form of DTP application program (like Quark Xpress (TM)), with the color images residing in the final PostScript representation as an EPS (Encapsulated PostScript) file (PostScript is a trademark of Adobe Systems). When composed pages are ready to generate final films, the PostScript file is separated into four or more "layers" that represent the fundamental printing colors. Aside from the standard 4-color process inks of cyan, magenta, yellow, and black (abbreviated as CMYK), extra colorants can be added as "spot colors" to enhance specific colors (such as a Pantone (TM) 222, etc.). Spot colors are not considered in this specification.

Creation of 4-Color Separations

In the DTP market, the majority of images are stored in a red, green, and blue (abbreviated RGB) format. Most low-cost scanners can only provide RGB colors to the computer because the scanner has no sophisticated processing power. Also, most application programs that manipulate images want RGB as the primary color space. Some programs allow for Cyan, Magenta, Yellow, and Black (abbreviated CMYK) color files to be manipulated, but most convert images into RGB so that they can be quickly viewed on color monitors. Almost all DTP image processing applications perform imaging operations in a RGB (or another tristimulus) color space. This is both for simplicity of computation, and to reduce storage space in memory. RGB images are typically 24-bits (8-bits each for red, green, and blue), whereas CMYK are typically 32-bits (8-bits each for cyan, magenta, yellow, and black). There has been a trend recently of increasing the color depth of primaries from 8-bits per color, to 12-bits, and even 16-bits, per color primary. The techniques set forth in this specification are easily extended from 8-bit primaries to 12-bit and 16-bit primaries, with an accompanying decrease in computational speed and increase in storage requirements. All descriptions in this paper will be based upon 8-bit primaries unless specifically stated to the contrary.

When a DTP page is finally ready for production, it must be separated into the four primary colors used on the printing press (more if spot colors are involved). Until the advent of Adobe's PostScript Level 2, all separation processing had to occur before the PostScript files were transmitted to the RIP (Raster Image Processor) which created the electronic signals which an imagesetter uses to expose film. This was necessary since the original PostScript (called PostScript Level 1) did not support the mathematical operations of transforming colors from the input images into the output separations in a manner that matched commercial printing practice. PostScript Level 2 should be able to do this in the future, once Color Rendering Dictionaries (mathematical transform tables) can be calibrated.

The process of transforming RGB (or another tristimulus) color space into a CMYK color space is a "one-to-many" process. A fixed set of three numbers that make up the RGB values produce a unique color. CMYK consists of four values, and there are a large number of CMYK combinations that can provide a very reasonable rendition of the original RGB set. There is no "exact" algorithm to go from RGB to CMYK. Historically, transformation tables were constructed that mapped the visual space of RGB into resulting CMYK values. These transformations were often performed by an empirical trial-and-error method. From a given color table of 1000 entry points, interpolation was employed to map the remaining 16.7 million colors of RGB to CMYK by choosing nearest neighbors of the known color values. The interpolation schemes for computing resulting colors from the fixed table values are well known.

In contrast to the "table-and-interpolate" method of color separation, there is another method that uses transformation matrixes. Rather than attempting to make an empirical grid of colors that span the printing color space, and interpolate between them, the other method fixes some "end point" colors and uses matrix multiplication to "best fit" the color space. Both 3×3 and 4×4 matrix multiplications, often coupled with lookup tables (LUTs), do a "best fit" to a series of step wedges in each primary color plus secondary colors. The absolute color value (typically in a CIE Lab tri-stimulus color space) of the step wedges are measured and used to provide statistics of how well a color match is made. Parameters are adjusted within the matrixes until a minimum error matrix is achieved. Once the "training trials" have conditioned the parameters within the matrixes, then any RGB input set can be transformed with matrix multiplications to obtain a CMYK result. The advantage of the transformation matrix solution is that only a few numbers are needed to describe the process (typically less than 40 values). The disadvantage is the tremendous amount of mathematical calculation needed to transform an image that typically measures 3,000 pixels by 5,000 pixels. A pixel is the smallest cell in a digital image.

Traditional, high-cost pre-press scanners have always transformed the intrinsic RGB signals from their sensor arrays into CMYK by using the "table-and-interpolate" method. The earliest machines used analog electronics that depended on a sizeable number of potentiometers to set the "control points" for the color tables. Later versions of the traditional scanners used digital electronics to interpolate the RGB to CMYK table points which were typically entered via control panel digital knobs or from computer keyboards. Only since 1985 have there been specialized floating point coprocessors and DSP (Digital Signal Processor) chips with sufficient capacity to allow a transformation matrix approach to color separation. The transformation matrix approach is the basic technology of PostScript Level 2's Color Rendering Dictionary. Although PostScript Level 2 allows programming of "table-and-interpolate" algorithms within the RIPs, the standard method of color separation is based upon matrix multiplication technology.

PostScript files with color images embedded in them are currently separated into four distinct Postscript jobs with each job containing the information for a specific printer color. There are some DTP applications (for example, Aldus' PrePrint) which will separate a single Postscript job containing either RGB or CMYK images into the four separate PostScript jobs which contain information for only a single color. There are other DTP applications (for example, Quark's Xpress or Aldus' PageMaker) which perform the 4-color separations internal to the program, and generate the individual PostScript files already separated into the component colors.

The current disadvantage of both the "table-and-interpolate", and the transformation matrix methods of 4-color separation, is inflexibility. Once the tables for the "table-and-interpolate" are created, often by hand in a long and laborious process, they cannot be easily changed to accommodate a new set of printing inks or a new printing paper stock. The inflexibility accusation also extends to the "best fit" parameters for the matrix multiply coefficients. Once they have been determined for a given set of printing conditions, the process usually has to start all over again if the conditions change in the slightest manner.

Creation of 7 Color Separation

As a result of the ink impurities present in the 4-color process printing, printers have experimented over the years with using 5, 6, and 7-colors to produce color images. These additional colors are not "spot colors" used to create special effects (like luminescent inks). The additional colors are intrinsically part of the color separation process to create realistic images. Harald Küppers (U.S. Pat. Nos. 4,812,899 and 4,878,977) has used cyan, magenta, yellow, black, red, green, and blue (CMYKRGB) to create some striking images for the DRUPA 1990 printing show. Deutscher Drucker, Nr. 11/5.4.1990. See pages I–VIII in the article "Die Siebenfarben-Evolution-eine neue optische Dimension". Beyond the standard CMYK colors, the additional colors—red, green, and blue—provide more realistic color than combining two colorants from the traditional set (CMYK) which together would create the illusion of a red or green or blue. The increased color gamut of using seven primary inks can more accurately approach the color range available with color monitors and photographic color film.

Creation of such 7-color separations in the prior art have encountered difficulties for a number of reasons. There are press environment problems encountered in such multi-color printing by priming press operators in which more than four colors are used to produce color images. With half-tone screening of more than four color separations, moiré problems can develop above and beyond those which might occur just with four color printing. Transition from four color to more than four colors can require in previous methods re-calibrating the entire system. Finally, prior art printing with more than four colors typically only handled contone (CT) parts of a page.

SUMMARY OF THE INVENTION

It is an object of this invention to provide an improved method for creating at least 5 to 7 color separations which can be used in either a traditional pre-press environment or in the PostScript environment, and which solves the aforementioned problems in the prior art.

The present invention solves the aforementioned problems in the prior art in the following ways. Correction Tables are provided which separate out press environment deficiencies into unique tables which can be modified by printing press operators. The inventive method employs half-tone screening on 5 to 7 color images without special considerations to remove or minimize moire problems. The steps of the present invention allow for a high speed implementation to produce output. There is no requirement for floating-point operations to be performed in the computation steps of the invention. This is quite unique for any color calculations that involve interpolation. With the present invention, a quick transition can be made from 4 color to 5 color to 6 color to 7 color output with a minimum of table adjustment. Prior methods would have to start by recalibrating their entire system from first principles. With the present invention, separation of colors can be performed at the PostScript RIP stage in the printing process. The separations in the present invention extend to both the linework (LW) and the contone (CT) part of a page. Prior art separation processes will only handle CT parts of a page.

According to the present invention, a method is provided for creating at least 5 color separations for input to a RIP for creation of at least 5 screen separations for use with at least a 5 color press to create at least a 5 color printed page. A scanned digitized image is created comprising three primary colors by use of the scanner. Thereafter, the digitized image in the form of three digitized input color image signals is input into a digital color separation computer which is separate from the scanner and which creates at least 5 single color unscreened contone image separations in the form of computer files. The at least five computer files are input to a raster image processor (RIP) to create at least 5 single screen separations in the form of electrical signals. The electrical signals are fed to a film recorder to create at least 5 single color screen separation films employed in conjunction with at least a 5 color press to create the at least 5 color printed page.

The digital computer used to create the at least 5 single color unscreened image separations employs a group of correction tables that contain correction files which are initially created with default values. This table group comprises a plurality of tables for various press environmental conditions. An intermediate stage of corresponding 4 color signals are computed from the three digitized color imager signals of the scanned image. A fifth color is created from the four colors by searching for a maximum saturated color among the three digitized color image signals. Correction factors from the table are applied to the four colors plus the fifth color to obtain at least 5 single color separations.

BRIEF DESCRIPTION OF THE DRAWINGS

FIG. 5 is a perspective view of the so-called delta correction table also employed in the process shown in FIGS. 1 and 4 for the creation of at least 5 color separations.

DESCRIPTION OF THE PREFERRED EMBODIMENTS

Figure 1:
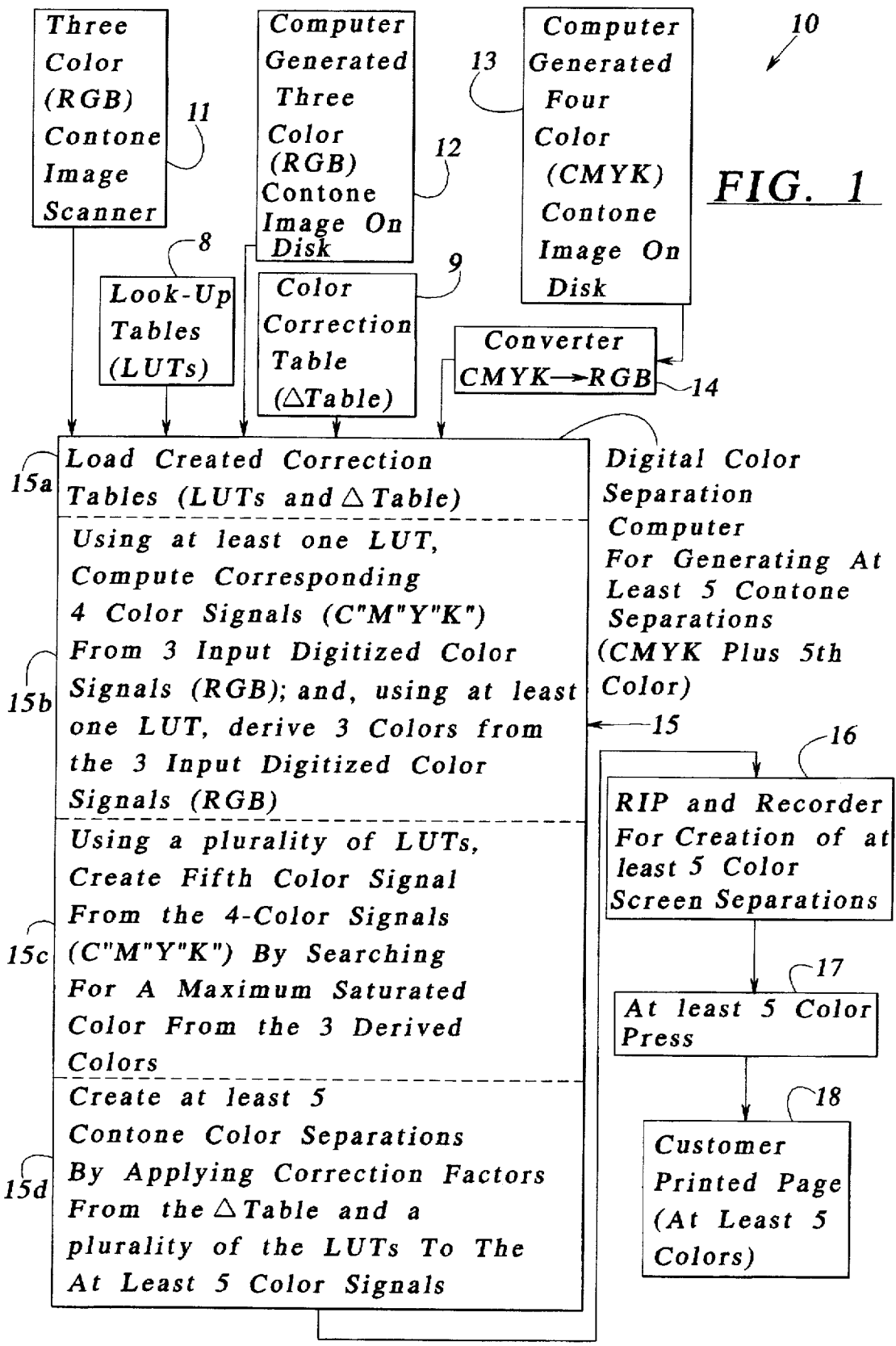
FIG. 1 is a block diagram illustrating the process steps for creating 5 to 7 color separations on a multi-color press according to the present invention.

FIG. 1 generally illustrates at 10 the process according to the invention for creating 5 to 7 color separations used in a multi-color press. An image scanner 11 scans a contone (CT) image (which can include line work (LW) such as text) to create three color contone image signals, typically R, G, and B. The image scanner 11 may also scan linework (LW), such as text or logos, to also create R, G, B signals. Alternatively, a disk 12 may be provided having stored thereon a 3-color contone image. In another alternative, a disk 13 having a computer generator 4-color contone image thereon may be provided where the colors are, for example, CMYK. These colors can then be converted in a converter 14 using commercially available conversion techniques to convert the 4-colors (CMYK) to three colors (RGB), for example.

Of course the computer generated image on the disc was originally scanned in a scanner into the computer which created the disk. Thus, all of the digitized images on the disks or from the scanner were created at some point from a scanner, and, thus, hereafter will be known as scanned digitized images.

The scanned digitized image from one of the inputs 11, 12, or 13 is then input in the form of three input digitized color image signals RGB into the digital color separation computer 15. It is to be understood that the term digital color separation computer merely indicates any general purpose computer which performs the process of 5 to 7 color separation as described in the present invention. These three digitized color image signals are often referred to as a digital tristimulus signal. The color separation digital computer 15, by programmed steps described hereafter, generates at least 5 single color (contone) unscreened image separations in the form of computer files. These computer files are then forwarded to a commercially available raster image processor (RIP) as is well known in the art, to which is attached a recorder as shown at 16 for creation of color screen separations. As is well known in this art, the raster image processor (RIP) converts the contone color files and PostScript drawing instructions into electronic half-tone screens represented by electrical signals which are then fed to the laser recorder for exposing film, the exposed film for each color representing a so-called screen separation, with one screen separation for each of the at least five colors.

Because of advances in computer technology and processing power, it is entirely feasible and within the scope of this invention to permit the digital color separation computer 15 to share hardware with the RIP 16 shown in FIG. 1.

Thereafter, the at least 5 screen separations are transformed into at least 5 printing plates via a photographic exposure of the screened films on to metalized printing plates (paper and polyester plates may also be employed). Thereafter, the at least 5 metal printing plates are mounted on the 5 or more printing stations of a commercially available printing press 17. The 5 or more color press then prints a customer page 18 in at least 5 colors, as is well know to those skilled in this art.

When the term "5 color press" is used in the present context, it should be understood that this could be a 4 color press in which the fifth color separation is employed after running the four colors. Similarly, for a 6 or 7 color press, it might a 4 color press where the three separations are then run after running the first four colors. Alternatively, of course, 5, 6, or 7 separate press stations could be employed in a true 5, 6, or 7 color press.

Figure 3:
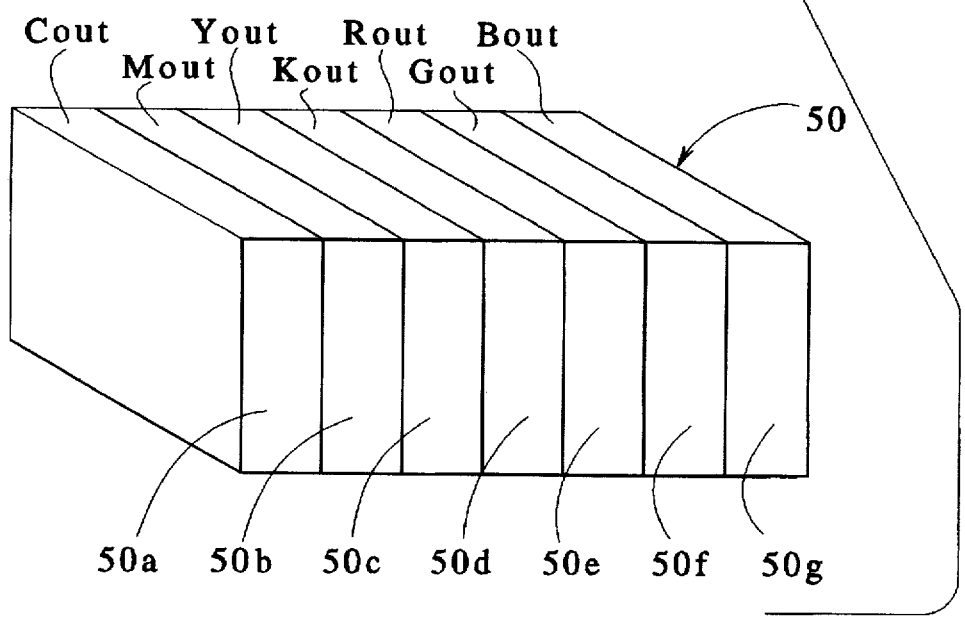
FIG. 3 is a schematic illustration showing Look Up correction tables (LUTs) employed in the process of FIGS. 1 and 4 for the creation of at least 5 color separations.

Prior to creation of the at least 5 color separations by the digital color separation computer 15, correction tables were first generated. These correction tables are of two basic types. As shown in FIG. 3, look up tables (hereinafter known as LUTs) for printing environment parameters are created.

These are shown and explained in FIG. 3 hereafter. A second type of correction table known as the color correction table or Δ table (hereinafter referred to as the Δ table), is created which provides corrections to model real world inks. A color correction table is explained with reference to FIG. 5 hereafter. The use of the LUTs and the Δ table by the digital color separation computer processing is shown in greater detail in FIG. 4 as described hereafter.

Now a broad description of the process steps performed by the color separation digital computer 15 will be described. Initially, as shown at 15a in FIG. 1, the correction tables are loaded (that is the LUTs and the Δ table). As shown at 15b, the computer 15 then computes corresponding 4 color signals (CMYK) from the input digitized color signals (RGB), and also derives three colors from the 3 digitized input color signals (RGB).

Thereafter, as shown at step 15c, the computer 15 creates a fifth color from the 4 color signals (CMYK) by searching for a maximum saturated color from the three derived colors in step 15b above. Finally, as shown at step 15d, the computer 15 creates the at least five contone color separations by applying correction factors from the correction tables (Δ table and a plurality of the LUTs) to the five colors.

Overview Of Color Separation Computer Process Steps

The color separation computer process employs a simplified mathematical expression for the relationships of primary colors, plus a correction table, to produce the desired separations. The process can produce 5, 6 or 7 color separations. For simplicity, the steps for implementing 7 color processing are described. The steps described are also applicable to creation of 5 or 6 color separations and to produce separations of a lesser number of primary colors than 7, the computer program uses the standard CMYK components to produce whichever of the RGB colors is not present in the traditional way. The correction table would have no entries for the RGB color(s) which are not present.

There are basic mathematical formulae that relate how additive color primaries (RGB) are derived from subtractive color primaries (CMY). The following formulae assume that RGB and CMYK are specified in percentage values with 100% meaning that the color is fully applied or "on". It also assumes that 0% means that whatever is beneath the current color is allowed to show through, or that the color is "off". In real practice, the RGB and CMYK are specified as 8-bit values having a range from 0 (meaning "off") to 255 (meaning full "on"). Percentage units will be used through this specification to simplify comprehension of the process although 8-bit (or 12-bit or 16-bit) primary values are used in the actual program:

$$R = 100\% - C \tag{1}$$

$$G = 100\% - M \tag{2}$$

$$B = 100\% - Y \tag{3}$$

Since the color white (W) is the presence of equal amounts of RGB (the additive theorem), and the color black (K) is the presence of equal amounts of CMY (the subtractive theorem), the following equations are true:

$$K \text{ (black)} = \text{Min}(CMY) \tag{4}$$

$$W \text{ (white)} = \text{Min}(RGB) \tag{5}$$

where MIN() refers to selecting the minimum of the colors shown in parentheses.

While equations 1-5 are true for theoretically perfect colors, they are inadequate to describe commercial printing inks where the magenta ink often contains as much as an 18% contamination of cyan, and the cyan ink may contain up to 8% magenta.

The color separation computer process starts with equations 1-4 and then compensates for the imperfect inks, dot gain, ink tack, and other print shortcomings by means of a zero-based correction table.

Figure 2:
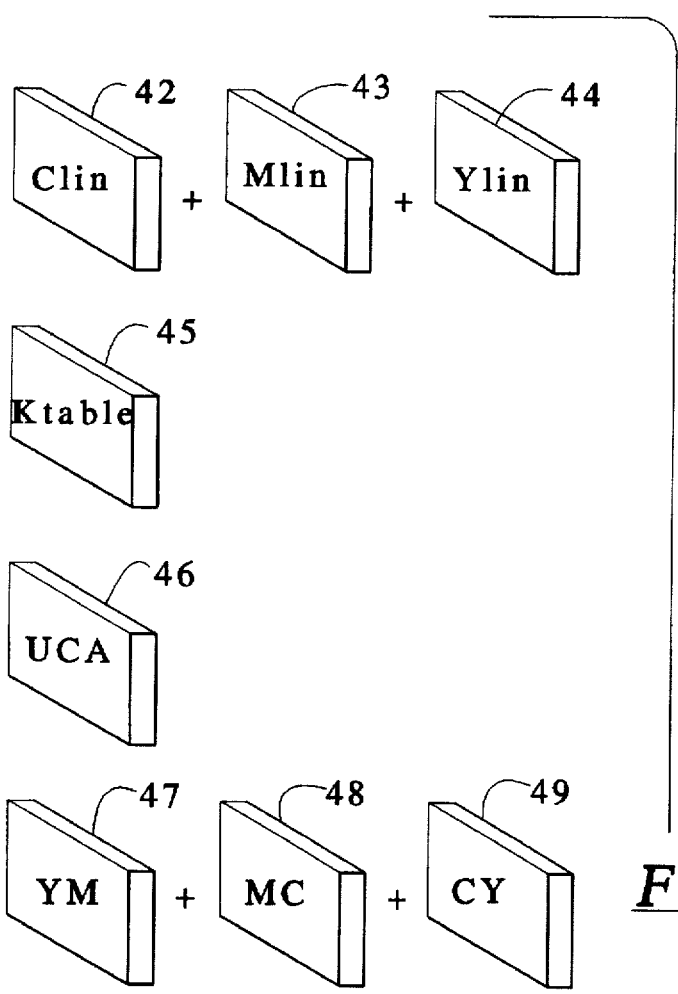
FIG. 2 is a schematic representation in the form of a color wheel showing how additive colors are related to subtractive colors (CMY) as is known in the prior art.

FIG. 2 shows on the colorwheel 19 a schematic representation of how the additive colors (RGB) are related to the subtractive colors (CMY). If equal amounts of yellow and magenta are mixed, the resultant color is red. Similarly, equal amounts of green and blue would yield cyan in a printing environment. The basis of the 7-color separation in the color separation computer process is to find the two dominant colors in the CMY color space, and then determine which RGB color will replace the smaller of the two dominant colors. The following example illustrates the basic color process:

1) initial color is: R=70% G=62% B=30%
2) convert to CMY from equations 1-3: C=30% M=38% Y=70%
3) find K using equation 4: K=Min(CMY)=30%
4) remove K from CMY: C'=0% M'=8% Y'=40% (steps 2) through 4) correspond to 15b in FIG. 1)
5) find the two largest primary colors: 1st is Y' at 40%, 2nd is M' at 8%
6) using the color wheel in FIG. 2, Y and M yield R at 8% (the amount of the smaller of the two dominant CMY colors),
7) remove R amount from Y' and M':C"=0% M"=0% Y"=38% R=8% C'"=0% M'"=0% Y'"=38% R'"=8% K'"=30%

The use of Y, Y', and Y" denotes the changes to the yellow color during the various process steps of color separation computer process of the invention. The same is true for M, C, K, R, G, B and their primed quantities, respectively.

Note that, in the preceding example, we started with non-zero values for RGB, and ended up with non-zero values for only three colors: yellow, red, and black. This is a property of the use of equations 1-5 and the supposition that equal amounts of the subtractive color set will produce an equal amount of the proper additive color. The example is greatly simplified to show the basic flow of how the process works. In reality, if we start with non-zero values of RGB, the color separation computer process will typically yield non-zero values for five of the 7 color primaries.

An additional feature of the color separation computer process is that one of the five non-zero values will be very close to zero percent (typically 4% or less). This means that only four primary colors (of the CMYKRGB set) will be printing at any single pixel location (or in a rosette structure). The advantage of this feature is that the moiré problems that have typically been associated with previous experiments in 7-color printing will be non-existent. Neither irrational tangent screening, nor the HPS screening (High Precision Screening) of Linotype-Hell, produce any noticeable moiré with 4-color screening. Since the color separation computer process only produces four colors at any point in an image, the traditional screen angles of 4-color printing will be completely sufficient to solve moiré problems in 7-color screening. It also means that stochastic screening for 7-color images will produce very similar results to stochastic screening for 4-color images, since only 4 inks will be present in any given rosette or pixel.

Color Separation Computer Process In Detail

Color separation in commercial printing has to account for impurities in the ink (known as additivity failure), dot gain, maximum dot percent, color cast of the printing stock, variable ink trap depending on the order of color on the press, etc. The term "maximum dot percent" (or "max dot percent") is a phrase well known in this art and refers to the summation of all colors of ink at a given point in the image. To compensate for these various problems, hereinafter known as press environmental conditions, the invented process has a number of LookUp Tables (LUTs) which attempt to separate out these various problems from the simplistic approach to color separation outlined previously. These LookUp Tables (LUTs) are shown in FIG. 3. The advantage of such LUTs is that they facilitate a change in the printing process (for example, the use of different colored inks) with only a small number of parameter changes in the entire process. This should be compared to the "table-and-interpolate" or the transformation matrix methods, where a change of printing inks would necessitate a complete re-calibration of the entire system.

Fifteen different LUTs have been selected as representative of primary press environmental parameters that need alteration in the commercial printing environment. These are single variable lookup tables (8-bit) with single output values (8-bit). Higher or lower precision tables could be used, but the uniformity of all LUTs to the same resolution greatly simplifies the programming aspects.

The LUTs shown in FIG. 3 generally are created for the following printing environment parameters used in the creation of the at least 5 color separations according to the invention:

LUTs Clin, Mlin, Ylin: smooth chromatic black determined using step wedges of overprinted CMY: property of the inks LUT Ktable: smooth achromatic black adjusted for maximum dot density and textual blackness of page: property of paper and press condition LUT UCA: determines "richness" of black on page, adjusted for maximum dot density and print-through on a specific paper: property of paper and artistic content LUTs YM, MC, CY: needed to boost or retard secondary colors for bright visual effects; determined by using overprinted step wedges of YM, MC, CY: property of inks and artistic content LUTs Cout, Mout, Yout, Kout, output linearization to match press changes and Rout, Gout, Bout: small ink density changes; determined by primary and secondary output step wedges: property of printing press and paper The following list more specifically names each LUT and identifies its use: (See FIG. 3)

TABLE 1

LUT definitions

Figure 4:
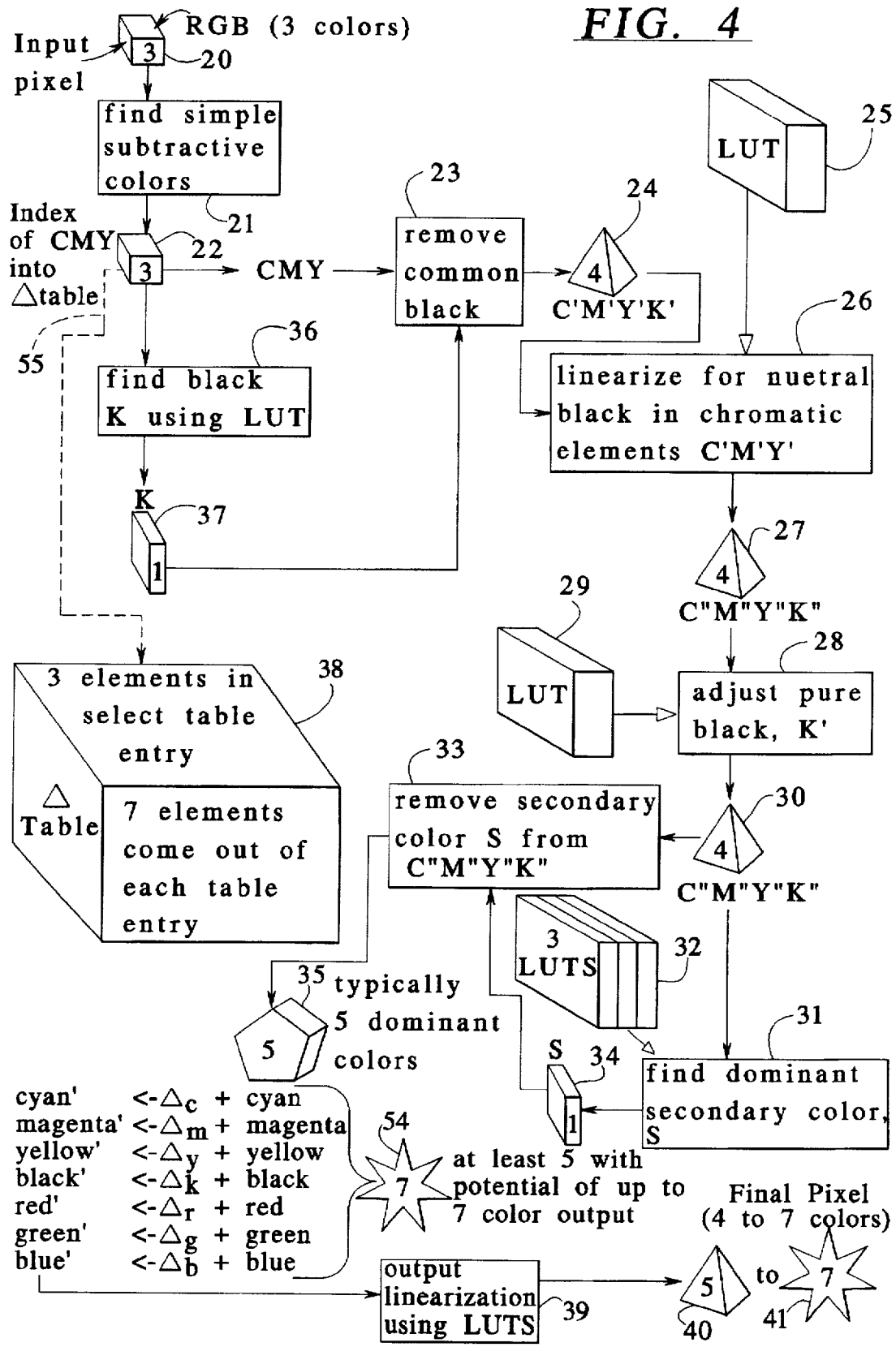
FIG. 4 is a flow chart for illustrating in greater detail process steps of the color separation computer shown in FIG. 1.

1) Clin(C): this LUT shown at 42 in FIG. 4 takes cyan as an input variable and linearizes its output so that equal amounts of CMY, having been processed through Clin(C), Mlin(M), and Ylin(Y) will yield a neutral black.
2) Mlin(M): this LUT 43 takes magenta as an input variable. See Clin(C).
3) Ylin(Y): this LUT 44 takes yellow as an input variable. See Clin(C).
4) Ktable(K): this LUT 45 takes black. as an input variable and directly determines the amount of black that will appear in the image. This LUT directly affects max dot percent in an image because black typically dominates when four colors print.
5) UCA(K): this LUT 46 takes black as an input variable. The amount output from the table represents the Under Color Addition (UCA) amount of color that is to be removed from the skeleton black, and rejoined to the 3-color black of the CMY components. This LUT directly affects the max dot percent because it causes roughly 3 times the max dot percent to increase for every unit of max dot percent it removes from the K component.
6) CY(min(CY)): this LUT 49 takes the smaller of cyan or yellow as its input. Its output is the amount of green that will be enhanced or retarded over a direct substitution amount. This output is removed from both C and Y, and added to G.
7) YM(min(YM)): this LUT 47 takes the smaller of yellow or magenta as its input. Its output is the amount of red that will be enhanced or retarded over a direct substitution amount. This output is removed from both Y and M, and added to R.
8) MC(min(MC)): this LUT 48 takes the smaller of magenta or cyan as its input. Its output is the amount of blue that will be enhanced or retarded over a direct substitution amount. This output is removed from both M and C, and is added to B.
9) Cout(C): this LUT 50a (part of LUT group 50 shown in FIG. 4) takes cyan as an input variable and corrects the final output cyan amount for linearization and dot gain of the output device.
10) Mout(M): this LUT 50b takes magenta as an input variable and corrects the final output magenta amount for linearization and dot gain of the output device.
11) Yout(Y): this LUT 50c takes yellow as an input variable and corrects the final output yellow amount for linearization and dot gain of the output device.
12) Kout(K): this LUT 50d takes black as an input variable and corrects the final output black amount for linearization and dot gain of the output device.
13) Rout(R): this LUT 50e takes red as an input variable and corrects the final output red amount for linearization and dot gain of the output device.
14) Gout(G): this LLFT 50f takes green as an input variable and corrects the final output green amount for linearization and dot gain of the output device.
15) Bout(B): this LUT 50g takes blue as an input variable and corrects the final output blue amount for linearization and dot gain of the output device.

The LUTs can be easily divided into four functional groups: Gray balance, Black balance, RGB boost, and Output linearization. The Gray balance group consist of Clin, Mlin, and Ylin. These tables produce a neutral gray for equal amounts of input RGB (which are translated into CMY). The Gray balance is what primarily needs to be changed if a slightly different set of primary color inks is used. The Black balance group attempts to correct the printing process from the skeleton black that is put into the algorithm by removing the maximum amount of "blackness" from the 3-component colors of CMY. This is accomplished by taking the least amount of common cyan, magenta, and yellow, and making that quantity the proposed black amount. While skeleton black usually results in the smallest max dot percent, it also produces weak black colors. Most printing establishments strike a compromise between skeleton black images and full black images. The Ktable determines how much of the maximum black that was permitted to exist will remain in the final image. UCA determines how much of the black that was taken from the CMY components will be returned to them in order to produce a rich 3-color black in addition to the K component black. The RGB boost group determine how much of the dominant colors in CMY will be replaced by RGB, respectively. Only one color from RGB will be allowed to print in any given pixel or rosette. The RGB boost can either enhance or retard the maximum allowed amount (which is the smaller of the dominant CMY colors). The RGB boost group might also need to be changed if drastically different primary inks were introduced into the printing environment. The final group is for output linearization. It needs all seven colors to be represented since all seven may print somewhere in the image. The purpose of having output linearization is to take into account minor variances in ink strengths or to compensate for different press dot gains for different colors. The output linearization group is typically what needs to be changed when a page goes from one press facility to another. Assuming proper calibration of the other parameters, only the output linearization group would change from press to press.

In the following equations, C, C', C", C''' etc. will denote the various changes in the cyan color as the various stages of processing are applied to it. The same is true for the other color components. The same numerical example as in the previous section is employed. Now the processing performed by the digital color separation computer 15 shown in FIG. 1 will be described with reference to FIG. 4. Note that in FIG. 4, all of the geometrical objects which contain a number (example, a cube with the number 3 inside) refer to the number of colors involved at that stage of the process:

1) input color is: R=70% G=62% B=30%—see 20
2) the process 21 uses equations 1–3: the resultant colors C=30% M=38% Y=70% are shown as geometric object 22

3) the proposed K, as shown in the process 36, with a resultant K=30% (see 37) is min(C,M,Y).

4) remove K from CMY as shown in process 23 with the result: C'=0% M'=8% Y'=40%—see 24.

5) the single input variable table for UCA depends only on K and generates the UnderColor Addition value shown at table 25, which in turn determines intermediate C"M"Y"K' values calculated in process 26 and shown at 27. The Ktable () shown at 29 transforms the input value of K found in 3) and creates the standard black value in process 28. The new intermediate values of C"M"Y"K' are shown at 30.

6) the RGB boost amount is based only on the two largest components of the original CMY set. In this example, the largest component is Y=70% and the second largest component is M=38%. This means the RGB boost will come only from the YM() function. The input parameter to YM() is the minimum value of either Y or M. In this particular example, YM(M) denotes the correct input parameter, M, which in cases of this example will yield the output value for YM(M=38%)=-5%. What this means is that the R value will be decreased by 5% over its theoretically computed value of 8%. R is initially set to 8% since that is the smallest of the Y' and M' components (which, when mixed together in equal amounts, yields red). The resultant selection of the dominant secondary color, S, which was the color red in this example, is denoted as the process 31 in FIG. 4. The three tables 32 represent the choice of CY(), YM(), and MC() to match the dominant color S, which is shown at 34. In the example of red as the dominant color, the YM() table was used. The Y' and M' values are used, rather than Y and M, to compensate for the black that has previously been removed from these two colors. Using Y and M as the values for the input parameter, rather than Y' or M', is simply a matter of convenience. Either set would work, and the corresponding YM() function would just need to be calibrated differently to compensate for K having been previously removed. The YM(M)=-5% means that R will have a -5% added to its computed value and that M' and Y' will have -5% subtracted from their previous amounts. So, R=8%+(-5%)=3% and M"=M'-(-5%)= 13% and Y"=Y'-(-5%)=45%. This process is shown at 33 in FIG. 4. These are not the true intermediate values since the UCA() function is added to the result and to perform gray balance. The result is shown in 7).

7) combining 5) and 6) together and using the Gray balance functions to achieve neutral grays:

C"=C'+Clin[UCA(K)]=0%+Clin[16%]=0%+14%=14%

M"=M'+Mlin[UCA(K)-YM(M)]=8%+Mlin[16%-(-5%)]=8%+Mlin[16%+5%]=8%+Mlin[21%]=8%+20%=28%

Y"=Y'+Ylin[UCA(k)-YM(M)]=40%+Ylin[16%-(-5%)]=40%+Ylin[16%+5%]=40%+Ylin[21%]=40%+22%=66%

K'=Ktable[K]=Ktable[30%]=37%

R=min(Y',M')+YM(M)=M'+YM(38%)=8%+(-5%)=3%

G=B=0 for this example.

Meaningful values of Clin[], Mlin[], Ylin[], and Ktable[] have been selected to demonstrate typical values for these types of corrections. All of the processes performed in 7) yield typically 5 colors shown at 35 in FIG. 4.

8) To all of the values in 7), including the colors that may be zero at this point, the $\Delta$ values are added which are based on the original CMY numbers. The $\Delta$ values are derived from sparsely populated tables that cover the complete color space, shown at the $\Delta$ table 38 in FIG. 4. A $\Delta$ value for a specific CMY set is interpolated from neighboring CMY values in the tables to produce the most accurate approximation. The CMY values used for interpolation are shown as the dotted line 55 in FIG. 4. Note that the $\Delta$s are signed quantities, which will be described more fully in the next section:

C'''=C"+$\Delta$(CMY, cyan)

M'''=M"+$\Delta$(CMY, magenta)

Y'''=Y"+$\Delta$(CMY, yellow)

K"=K'+$\Delta$(CMY, black)

R'=R+$\Delta$(CMY, red)

G'=G+$\Delta$(CMY, green)

B'=B+$\Delta$(CMY, blue)

This collection of seven total colors is shown at 54 in FIG. 4.

9) All of the quantities in 8) are now corrected for output linearization (see 39 in FIG. 4) to match specific dot gains, or specific presses, etc:

C""=Cout[C''']

M""=Mout[M''']

Y""=Yout[Y''']

K'''=Kout[K"]

R"=Rout[R']

G"=Gout[G']

B"=Bout[B']

The final result of all processes from the input pixel 20 to the output pixel 40 or 41 can contain from 4 to 7 non-zero colors. The determination of whether 4, 5, 6, or 7 colors print depends on the input pixel 20, and on all of the associated LUT tables and the $\Delta$ table.

Specific percentage values for steps 8) and 9) were not given because they depend on interpolation tables and on output linearization tables which are conceptually very simple. The $\Delta$(CMY, color) denotes that the interpolation depends on CMY as input values, but only a specific color's interpolation is added back into the calculations. Another way to state this is that there is a unique set of values for CMY, which is C=30% M=38% Y=70% for this example and is shown at 52 in FIG. 5. However, once the entry into the interpolation table is found, there are separate values for cyan, magenta, yellow, black, red, green, and blue from that specific table entry. These seven delta values are shown at 51 in FIG. 5. Only the proper color component is added back to correct each of the seven colors.

The $\Delta$ Table Values:

As referred to above, and as shown in FIG. 5, a $\Delta$ table (also known as a color correction table) is schematically illustrated at 53 in FIG. 5. This color correction table (also known as a $\Delta$ table) provides correction factors to model real world inks.

The $\Delta$ values introduced in item 8) of the previous section contain all the empirical corrections to the mathematical formulae that have thus far been used to transform an RGB input set into a CMYKRGB collection of seven separations. The $\Delta$ values have a unique feature in that they are zero-based. This means that the initial state of all the entries is zero. This would correspond to perfect printing inks with perfect combinational linearity and printing tack. Non-zero $\Delta$ values represent the corrections needed to compensate for imperfect ink. Because commercial printing inks are not chromatically pure, and have many physical properties which complicate the printing process, the corrections for these properties are encapsulated in the Δ table.

As a matter of computational convenience, the Δ table uses CMY (the original values derived from RGB by equations 1-3) as the input parameters. CMYK or C'''M'''Y'''K' could have also been used, but they would increase the size of the table with little improvement in output accuracy. Since the Δ table is very sparsely populated (a complete table for CMY would require 16.7 million entries), interpolation is required to provide the best accuracy for data points which do not lay directly on specific table values. The choice of interpolation technique (for example, nearest neighbor, bi-linear interpolation, cubic spline, to name just a few) is dependent upon the desired accuracy. There is a direct trade-off between sophistication of the interpolation technique and the size of the table to achieve the same level of accuracy. Empirical tests have indicated that a bi-linear interpolation technique coupled with a table containing 32,767 entries yields acceptable results.

The table method described herein is just one of many different possible configurations. This table configuration is called additive/multiplicative because its correction factors can be either additive or multiplicative on a per element basis. This gives tremendous flexibility in permitting large corrections with moderate errors, or small corrections with no errors at all. The table, as described in this example, has 32,767 entry points. An entry point is determined by taking the 5 most significant bits for each of the three components CMY, and then taking that 15-bit value as an address of the delta values. Since there are 7 values of output for each table entry (a delta for C, for M, for Y, for K, for R, for G, and for B), an integer multiplied by 7 of the 15-bit table address will yield a real base address in linear memory. In this example, the Δ table will occupy (2**15) * 7 bytes=229,376 bytes of memory. This is not an excessive amount by today's computer memory standards. Smaller tables could be constructed by only using the 4 most significant bits for each of CMY as the input address.

Once the input address of CMY yields the specific Δ table address, the 7 bytes located at that entry point are associated with CMYKRGB colors. Note that the Δ table correction can effect all 7 separation colors even though the mathematical treatment of the 7 color separation only had at most 5 colors present (see 35 in FIG. 4) (and only 4 colors having significant contributions). The ability to have all 7 separations receive corrections is a generality of the process. In practical applications of 7 color printing, 5 colors at most would be present in a given output pixel. In a rare case where the creator of the Δ table seeks to create special effects, the table could be adjusted to allow all 7 primary colors to be present in dark regions of an image. This would produce extremely high density blacks. It would also require that the press be driven very slowly because of the 500% max dot that would be present.

The individual components of a given Δ table entry point, called delta elements, are described in this patent specification as comprising a single byte. This is for memory conservation. However, 2-byte and 4-byte delta elements are easily constructed. The 8 bits within a byte are considered to be numbered from left to right as bit 7 through bit 0. Bit 7 in this example is considered to be a flag bit with 0 representing that the correction is done with addition, whereas a flag bit of 1 would indicate that the correction is accomplished via multiplication. Bit 6 is considered to be a sign bit for both the additive and multiplicative operations. Bit 5 through bit 0 contain the numerical value of the correction. This construction allows additive corrections from −64 to +64 units (in decimal) and the multiplicative corrections allow plus or minus 197% change in 3.125% steps. The combination of multiplicative and additive corrections allow a wide variation of change. An alternate algorithm has been constructed that consists only of a sign bit and 7 bits of numeric value for additive changes only. The same has been done with a multiplicative table consisting of a single sign bit and 7 bits of numeric value. Both of the alternatives have specific advantages, but the combined additive/multiplicative Δ table seems to produce excellent images with no noticeable loss of resolution.

Calibration of 7-Color Systems

The process of creating the LUTs shown in FIG. 3 and Δ table values shown in FIG. 5 are rather straightforward. Initially, all tables are set to unitary transformations, that is, each input value gives the same output value. The Δ table is created with all zeros which imply no correction at all. The first step is to print a series of step wedges in neutral gray (i.e., C=M=Y and K=O). From samples of the printed results, any color cast in the step wedge requires a corresponding negative adjustment from a straight line curve of the corresponding color. This will calibrate the Clin(), Mlin (), and Ylin() values. Once the color gray scale has been properly balanced, then a full color gray scale step wedge is printed. Measurement of the total amount of ink present on the paper will allow the Ktable[] to be adjusted so that % max dot and smooth color steps are obtained. The UCA[] table is also adjusted at this time to be sure that there is a smooth transition in the dark areas of the image and that sufficient density of ink is present in the shadows.

Pie shaped step wedges of cyan and magenta, magenta and yellow, and yellow and cyan are also printed going from black to saturated colors. The same procedure is used going from white to saturated color. An optical investigation of the smoothness of the transitions from cyan to blue to magenta will determine the RGB boost needed in the MC() table. Similar printings will provide the basis of the CY() and YM() boosts.

Once all of the input tables have been adjusted, it is time to print a broad gamut color patch table like Kodak's Q-60A or the IT8.7/1 and /2. From the large number of patches, one can find the areas where there is significant color shift. The Δ table can be manipulated directly by making small changes from the zero values. If one uses the IT8.7/1 or /2 targets, known CIE Lab values are output for each patch. One can measure what the printed output for each of these patches is with the 7 color output. The differences can be converted into an error signal which is translated into RGB or CMYK differences. These values can then be directly entered into the table. Smoothing calculations will need to be employed to be sure that no color "spikes" appear in the Δ table. Through an iterative process, the Δ table can be constructed in typically ten iterations of output, measurement, and correction to the tables. Once the Δ table appears reasonably stable, a least-square mapping program can smooth out the correction data to produce the most uniform printing results.

The seven output linearization tables need to come from measurement of the dot gain and other forms of press gain for a specific machine. These measurements are typically done once with step wedges done in all seven primary colors.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for creating at least five color separations for input to a raster image processor (RIP) for creation of at least five half-tone screen separations for use with at least a five color press to create at least a five color printed page, comprising the steps of:

creating a scanned digitized image comprising at least three primary colors by use of a scanner and outputting said digitized image as at least three digitized color image signals;

providing correction tables in the form of Look Up tables (LUTs) for storing printing environment parameters and in the form of a color correction table ($\Delta$ table) for providing corrections to model real world inks;

inputting said at least three digitized color image signals into a digital color separation computer which is separate from the scanner, and using said digital color separation computer and correction tables to create at least five single color unscreened image separations in the form of computer files;

inputting said computer fries to the RIP to create at least five single half-tone color screen separations in the form of electrical signals;

feeding said electrical signals to a film recorder to create at least five single color screen separation films; and using the at least five single color screen separation films in conjunction with at least a five color press to create the at least five color printed page.

2. A method according to claim 1 including performing with said digital color separation computer the following steps:

using at least one of the LUTs, computing corresponding four color signals from the three digitized color image signals input into the digital color separation computer, and, using at least one of the LUTs, deriving three colors from the three digitized color image signals;

using a plurality of the LUTs, creating a fifth color from the four color signals by searching for a maximum saturated color from the three derived colors; and creating at least 5 contone color separations by applying correction factors from the $\Delta$ table and a plurality of the LUTs to the at least 5 color signals.

3. A method according to claim 2 including the step of providing said correction factors as a group of tables on a common storage media which can be utilized with a plurality of different five color presses without significant adjustment of the correction factors.

4. A method according to claim 1 including the step of utilizing said digital color separation computer to create seven single color separations.

5. A method according to claim 4 wherein the seven single color separations comprise RGBCMYK.

6. A method according to claim 1 wherein the printing environment parameters comprise purity of printed inks, purity of paper on which inks will print, and maximum dot percent on the printed page.

7. A method according to claim 1 wherein the digital color separation computer shares hardware of the RIP.

8. A method for creating at least five color separations for input to a raster image processor (RIP) for creation of at least five screen separations for use with at least a five color press to create at least a five color printed page, comprising the steps of:

creating a plurality of correction factor tables having correction factors for a plurality of printing environment parameters;

creating a digitized image formed of at least three digitized color image signals;

inputting said digitized color image signals into a digital color separation computer, and using said digital color separation computer to create at least five single color unscreened image separations in the form of computer files by use of said correction factors;

inputting said computer files to the RIP to create at least five single color screen separations in the form of electrical signals;

feeding said electrical signals to a film recorder to create at least five single color screen separation films; and using the at least five single color screen separation films in conjunction with at least a five color press to create the at least five color printed page.

9. A method for creating at least five color separations for input to a raster image processor (RIP) for creation of at least five screen separations for use with at least a five color press, comprising the steps of:

creating correction tables in the form of Look Up tables (LUTs) for storing printing environment parameters and in the form of a color correction table ($\Delta$ table) for providing corrections to model real world inks;

providing a scanned digitized image represented by at least three digitized color image signals;

inputting said at least three digitized color image signals into a digital color separation computer;

with said digital color separation computer, and using at least one of the LUTs, computing corresponding four color signals from the at least three digitized color image signals, and using at least one of the LUTs, deriving three colors from the at least three digitized color image signals;

using the digital color separation computer, and using a plurality of the LUTs, creating a fifth color signal from the four color signals by searching for a maximum saturated color from the three derived colors;

using said digital color separation computer, creating at least five contone color separations by applying correction factors from the color correction table and a plurality of the LUTs to the at least five color signals, said color separations being in the form of computer files;

inputting said computer files to the RIP to create at least five single color screen separations in the form of electrical signals; and feeding said electrical signals to a film recorder to create at least five single color screen separation films which can be used in conjunction with at least 5 color press to create at least a 5 color printed page.

10. A method for creating at least five color separations for input to a raster image processor (RIP) for creation of at least five screen separations for use with at least a five color press to create at least a five color printed page, comprising the steps of:

creating a scanned digitized image comprising at least three primary colors by use of a scanner and outputting said digitized image as at least three digitized color image signals;

inputting said at least three digitized color image signals into a digital color separation computer which is separate from the scanner, and using said digital color separation computer to create at least five single color unscreened image separations in the form of computer files;

inputting said computer files to the RIP to create at least five single color electronic half-tone screen separations in the form of electrical signals;

feeding said electrical signals to a film recorder to create at least five single color half-tone screen separation films; and using the at least five single color half-tone screen separation films in conjunction with at least a five color press to create the at least five color printed page.

11. A method for creating at least five color separations for input to a raster image processor (RIP) for creation of at least five screen separations for use with at least a five color press to create at least a five color printed page, comprising the steps of:

creating a scanned digitized image comprising at least three primary colors by use of a scanner and outputting said digitized image as at least three digitized color image signals;

inputting said at least three digitized color image signals into a digital color separation computer which is separate from the scanner, and using said digital color separation computer to create at least five single color unscreened image separations in the form of computer files;

providing a color correction table for providing corrections to model real world inks, and utilizing said color correction table with said digital color separation computer when creating the at least five single color unscreen image separations;

inputting said computer files to the RIP to create at least five single color electronic half-tone screen separations in the form of electrical signals;

feeding said electrical signals to a film recorder to create at least five single color half-tone screen separation films; and using the at least five single color half-tone screen separation films in conjunction with at least a five color press to create the at least five color printed page.

* * * * *